C. VON HOFE.
STEREOSCOPIC TELEMETER.
APPLICATION FILED JUNE 18, 1907. RENEWED DEC. 8, 1908.
914,838.
Patented Mar. 9, 1909.
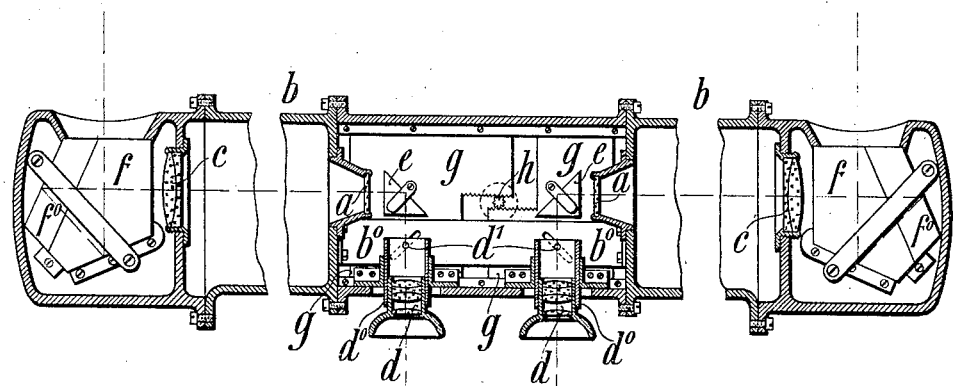
Fig.1
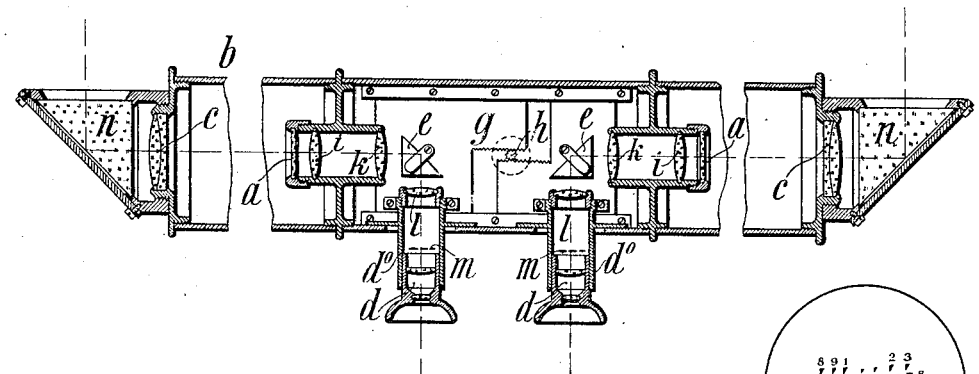
Fig.2
Fig.4
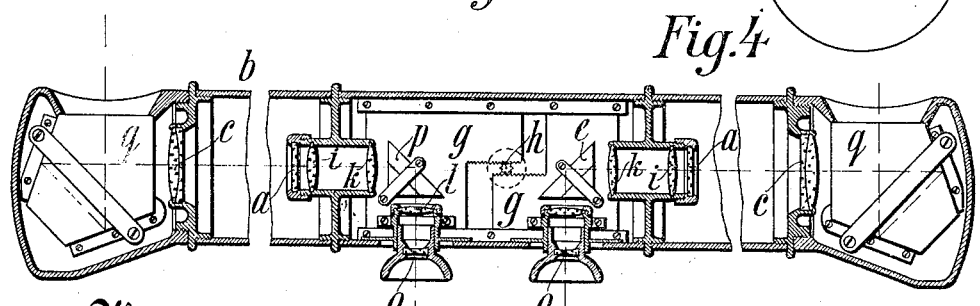
Fig.3
Witnesses:
Paul Krüger
Fritz Sander
Inventor:
Christian von Hofe

UNITED STATES PATENT OFFICE.

CHRISTIAN VON HOFE, OF JENA, GERMANY, ASSIGNOR TO THE FIRM OF CARL ZEISS, OF JENA, GERMANY.

STEREOSCOPIC TELEMETER.

No. 914,838.          Specification of Letters Patent.          Patented March 9, 1909.

Application filed June 18, 1907, Serial No. 379,564. Renewed December 8, 1908. Serial No. 466,507.

*To all whom it may concern:*

Be it known that I, CHRISTIAN VON HOFE, doctor of philosophy, a citizen of the German Empire, and residing at Carl-Zeiss strasse, Jena, in the Grand Duchy of Saxe-Weimar, Germany, have invented a new and useful Stereoscopic Telemeter, of which the following is a specification.

The invention relates to both kinds of stereoscopic telemeters described in the Patent 583,703, the one known as the fixed scale type and the other as the traveling mark type. But of these instruments only those are improved by the invention the base line of which is a multiple of the distance between the oculars, so that their casing consists chiefly of a tube transverse to the line of sight, and in which the adaptation of the distance between the oculars to the interpupillary distance in connection with the maintenance or restoration of the sharp focus of the oculars is effected by means of appliances for altering the position of hinder parts of the telescope in the sighting plane. Telemeters of this species have hitherto been constructed so that the two image fields containing the physical components of the stereoscopic scale or mark follow the ocular prisms and precede the Ramsden oculars which lie in the direction of sight, and further so that the oculars, ocular prisms and measuring marks can be moved in contrary directions along the transverse tube, the oculars alone, however, being movable in the direction of their axes.

The present improvement has arisen from the following knowledge. From the fact that the said component marks are movable parts of the telescope or are placed behind such a movable part the danger is to be apprehended, that a relative displacement of the component marks and of the image field containing them, that is to say derangement of the instrument, is liable to happen through accidental alteration of position of one movable part of the telescope. According to the present invention this drawback is removed by transferring the component marks into the transverse tube, that is to say into image fields, the axes of which have the direction of the transverse tube, securing them there and at the same time making only parts lying behind them movable. If this improved arrangement for adapting the distance between the oculars to the inter-pupillary distance be adopted in an instrument with terrestrial oculars, of the two image fields of each of which at least the front one lies in the transverse tube, it is possible to maintain the sharp focus without special shifting of telescope parts. For this purpose the said front image fields are provided with the component marks, the reversing system of the terrestrial ocular is divided into two separate component systems in such a manner, that between them the pencils are formed by parallel rays, at least the front component system is arranged in the transverse tube, and the hinder component system with telescope parts following it is made shiftable in the direction of the base line.

In the accompanying drawing: Figure 1 is a horizontal section along the sighting plane through a stereoscopic telemeter of the fixed scale type constructed according to the invention, some optical parts being shown in plan view for the sake of clearness. Fig. 2 is a horizontal section through a modified telemeter. Fig. 3 is a horizontal section through another modified telemeter. Fig. 4 is a face view of the left one of the two transparent plates carrying the component mark systems from which in each of the three telemeters the stereoscopic scale originates.

In all three examples the arrangement of the instrument is quite symmetrical, also in the sense, that in adaptation to the interpupillary distance both telescopes undergo equal alterations.

The stereoscopic telemeter according to Fig. 1 shows the transparent carriers $a\,a$ of the component marks, secured in the transverse tube $b$, so that the component marks, which may be arranged in several rows as shown in Fig. 4 lie in the image fields of the objectives $c\,c$. Between each carrier $a$ and the ocular $d$ appertaining to it a simple reflecting prism $e$ is arranged. The objective prism $f$ placed before each objective $c$ presents to the entering rays first a simple reflecting surface, whose effect on the image is afterward annulled by the ocular prism $e$, after that, however, a ridge surface $f^o$, the image-inverting effect of which cancels that of the objective $c$. To adapt the distance between the oculars to the inter-pupillary distance, the ocular prisms $e\,e$ are secured upon slides $g\,g$, which can be moved in opposite directions by means of a pinion $h$ operated from below the tube $b$. Upon each slide, an ocular tube $d^0$ is guided in the direction of its axis and engages by means of a pin $d^1$ in a slot of 45° inclination, recessed in the fixed bar $b^0$. In consequence of this arrangement each ocular $d$ in shifting the slide $g$, on which it together with the ocular prism is carried, is ranged in or out of the transverse tube $b$ to compensate exactly for the transverse shifting of the ocular prism $e$, so that the path of the rays from the carrier $a$ to the ocular $d$ maintains its length, and therefore the sharp focus of the oculars is likewise maintained.

In the telemeter according to Fig. 2, in order to erect the inverted image, which is projected by the objective $c$ upon the place of the carrier $a$ of the component marks, a terrestrial ocular is provided, consisting of the collective lens $i$, an inverting system the components of which are $k$ and $l$, and the ocular $d$ proper, which is arranged behind the erect second image indicated by $m$. The lenses $i$ and $k$ are chosen, so that the pencils leave $k$ in parallel rays. The lens $l$, from which these pencils are received, is in the present example arranged only behind the ocular prism $e$. It suffices in this case (and also if the lens $l$ were placed before the ocular prism $e$) to fix $l$ and $e$ together with the ocular tube $d^0$ upon the slide $g$, since the ocular prism $e$ does not alter the cylindrical form of the pencils, and the image, on which the ocular $d$ is focused, in consequence maintains its position at $m$ during the shifting of the slide $g$. Simple reflecting prisms $n$ can be arranged as objective prisms.

The arrangement of the instrument according to Fig. 3 has this advantage above the one according to Fig. 2, that the oculars do not project so far beyond the transverse tube. This arrangement can be considered as having taken its origin from Fig. 2 as follows: Instead of a real image being observed through the ocular $d$, a negative lens $o$ as in the Galilean telescope is made use of as ocular, but which entails a further inversion of the image. In order to present to the observer an erect image notwithstanding, the two deflecting prisms of each telescope considered as a whole are here as in Fig. 1 fitted with one inverting ridge and two simple reflecting surfaces, only that this time the ridge is given to the ocular prism $p$ and the objective prism $q$ is shaped like a Prandtl prism. The situation of the lens $l$ behind the ocular prism, as in Figs. 2 and 3, also allows of fixing this prism in the transverse tube and only leaving the lens $l$ and the ocular upon the slide $g$. A somewhat larger lens $l$ is then, however, necessary, so as to enable this lens, with any adjustment of the telemeter to the inter-pupillary distance, to transmit all rays leaving the prism $e$ to the ocular.

I claim:

1. A stereoscopic telemeter consisting of two telescopes each comprising an objective prism system and an ocular prism system, which four prism systems are fitted in a transverse tube forming the main casing, an objective, an ocular and a component mark system which is fixed in the transverse tube, such of the said optical parts, which lie behind the component mark system and form the hindmost portion, being movable for the purpose of adapting the distance between the oculars to the inter-pupillary distance and maintaining or restoring the focus of the oculars.

2. A stereoscopic telemeter consisting of two telescopes each comprising an objective prism system and an ocular prism system, which four prism systems are fitted in a transverse tube forming the main casing, an objective, a terrestrial ocular, the image-erecting system of which consists of two separated components, between which the pencils are formed of parallel rays and of which the front component is fixed in the transverse tube and the back component together with the following parts of the terrestrial ocular and with the ocular prism system is movable for adapting the distance between the terrestrial oculars to the inter-pupillary distance, and a component mark system fixed in the transverse tube in the front image field of the terrestrial ocular.

CHRISTIAN VON HOFE.

Witnesses:
 PAUL KRUGER,
 FRITZ SANDER.